R. F. TRATTNER.
PACKING FOR ROTARY PUMPS OR MOTORS.
APPLICATION FILED OCT. 4, 1909.
948,534.
Patented Feb. 8, 1910.
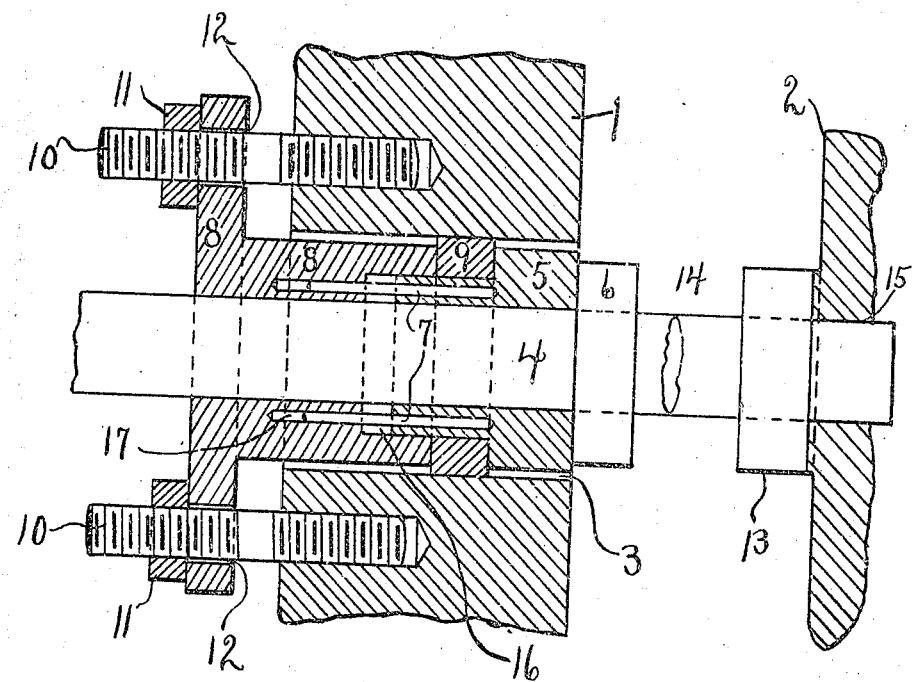
WITNESSES:
William A. Radcke
Oscar W. Dauber
INVENTOR
Rudolph F. Trattner
BY
Andrew H. Neureuther
ATTORNEY

UNITED STATES PATENT OFFICE.

RUDOLPH F. TRATTNER, OF PERU, ILLINOIS.

PACKING FOR ROTARY PUMPS OR MOTORS.

948,534.   Specification of Letters Patent.   Patented Feb. 8, 1910.

Application filed October 4, 1909. Serial No. 520,827.

*To all whom it may concern:*

Be it known that I, RUDOLPH F. TRATTNER, a citizen of the United States, residing in the city of Peru, in the county of Lasalle and State of Illinois, have invented a certain new and useful Improvement in Packings for Rotary Pumps or Motors, of which the following is a specification.

My invention relates to packings for rotating shafts for operating valves or other rotating parts within a closed chamber such as are used in rotary pumps, motors and engines, and has for its object the production of a packing which will not allow leakage and which will be very efficient in operation and very simple in construction.

The drawings show a longitudinal sectional view through my packing in a plan passing through the center of the rotating shaft.

Similar numerals represent the same parts throughout the drawings.

In the drawings, 1 represents one side of the casing of a rotary pump and 2 the other side of same. 1 has an aperture 3 through which the shaft 4 passes into an aperture or bearing 15 in side 2. Aperture 3 also forms the recess or opening into which the parts of my packing are inserted. Mounted rigidly on shaft 4 is a collar or shoulder 6. Adjacent to collar 6 on shaft 4 is journaled a shouldered sleeve 5, whose end which is in contact with said collar 6 forms a so-called " ground joint ", with the end of the collar 6. Journaled on shaft 4, and having a cylindrical recess 16 in its end concentric with shaft 4 is a member 8. Member 8 has apertures 12 through which pass the threaded studs 10 which are fastened into 1, and which have the nuts 11 by means of which the position of said member 8 can be adjusted along the shaft 4. The small shouldered portion of sleeve 5 projects into the recess 16 of said member 8. Fastened in the end of the smaller portion of shouldered sleeve 5 are the pins 7 which register with the apertures 17 in member 8 and which prevent the sleeve 5 from rotating with the shaft 4, the member 8 itself being prevented from so rotating by means of the studs 10 above mentioned.

Inserted between the shouldered sleeve 5 and member 8, and touching the circumference of the aperture 3 in side 1 is a yielding or an elastic ring 9 which is compressed by means of the studs 10, nuts 11 and the member 8, and which prevents the leakage by these parts.

In many rotary pumps the shaft 4 does not have a second bearing 15 in side 2 as I have here shown it, and it is not necessary that it should, as the pressure of the water on the vane (space for which is indicated at 14 on shaft 4) will keep the collar 6 against sleeve 5 sufficiently tight to prevent leakage. If the rotary pump has the second bearing 15 as I have shown it, a second collar 13 can be mounted on the shaft 4 and have a " ground joint " between it and the side 2, so that the adjusting of the packing could be entirely independent of the fluid pressure in the pump casing.

From the above description, it is evident, that in order to adjust my packing, it is only necessary to force the member 8 along the shaft 4 by means of the nuts 11 on the studs 10; that it is very simple and can be regulated just sufficiently to stop the leakage, so that there will not be any excessive friction on the rotating parts, making its mechanical efficiency very high.

It will be understood, of course, that while I have here shown one form of my device, I do not wish to limit myself to the exact form of the parts shown, but desire to have it taken in a sense diagrammatic of any or all the forms of same which fairly come within the scope of my claims.

I claim:

1. In a packing for rotary pumps, a frame, an aperture in said frame, a shaft through said aperture, a collar fastened on said shaft, a shouldered sleeve on said shaft adjacent to said collar, a member on said shaft adjustably connected with said frame and projecting into said aperture, a recessed portion on said member which slides over the smaller portion of said shouldered sleeve, means for coupling said member and said shouldered sleeve, and resilient means between said member, said sleeve and the circumference of said aperture.

2. In a packing for rotary pumps, a frame, an aperture in said frame, a shaft through said aperture, a collar rigidly mounted on said shaft, a shouldered sleeve, in which said shaft is rotatably mounted, adjacent to said collar, a member on said shaft with means for adjusting said member along the shaft, a recessed portion on said member which slides over the smaller portion of said shouldered sleeve, means for coupling said member and said shouldered sleeve, and a resilient ring between said member, said sleeve and the circumference of said aperture.

3. In a packing for rotary pumps, a frame, an aperture in said frame, a shaft in said aperture, a collar rigidly mounted on said shaft, a shouldered sleeve on said shaft in contact with said collar, a member on said shaft, means for adjusting said member along said shaft, means for coupling said member and said sleeve, and a ring of a yielding material between said member, said sleeve and the circumference of said aperture, substantially as shown and described.

RUDOLPH F. TRATTNER.

Witnesses:
ANDREW H. NEUREUTHER,
WILLIAM F. NEUREUTHER.